United States Patent [19]

Bauck et al.

[11] Patent Number: 4,743,989

[45] Date of Patent: May 10, 1988

[54] PLURAL MAGNETIC DISK ASSEMBLY

[75] Inventors: Randall C. Bauck; David E. Jones, both of Layton; Robert D. Freeman, Roy, all of Utah

[73] Assignee: Iomega Corporation, Roy, Utah

[21] Appl. No.: 854,292

[22] Filed: Apr. 21, 1986

[51] Int. Cl.[4] .................... G11B 23/03; G11B 15/64
[52] U.S. Cl. ................................. 360/133; 360/99; 360/102
[58] Field of Search .................... 360/98–99, 360/102, 133

[56]         References Cited
        U.S. PATENT DOCUMENTS

| 4,074,330 | 2/1978 | Norton | 360/102 |
| 4,159,494 | 6/1979 | Evans | 360/133 |
| 4,229,774 | 10/1980 | Janssen | 360/102 X |
| 4,296,448 | 10/1981 | Garcia | 360/102 X |
| 4,447,899 | 5/1984 | Geyer | 360/102 X |

OTHER PUBLICATIONS

IBM T.D.B., vol. 20, #3, Aug. 1977; J. R. Cope; Bernoulli Disk Decoupler & Stabilizer, pp. 916–917.
IBM T.D.B., vol. 19, #9, Feb. 1977; D. H. McMurtry; Double Bernoulli Disk Conf.; pp. 3573–3574.

Primary Examiner—A. J. Heinz
Attorney, Agent, or Firm—Woodcock Washburn Kurtz Mackiewicz & Norris

[57]         ABSTRACT

A device and process for stabilizing two coaxially joined flexible magnetic disks is disclosed. Two or more flexible magnetic disks are coaxially joined by a coaxially located spacer. One of the disks is juxtaposed to and rotated against a flat stable Bernoulli surface. A second disk spaced by the spacer from the first disk contains centrally located perforations into which air can flow. When the disks are rotated at high speed air flows into the perforations and radially out from between the disks, thus forming an air cushion or air bearing between the disks. The apparatus and process thus provides two floppy disks stabilized by a single Bernoulli surface.

33 Claims, 8 Drawing Sheets

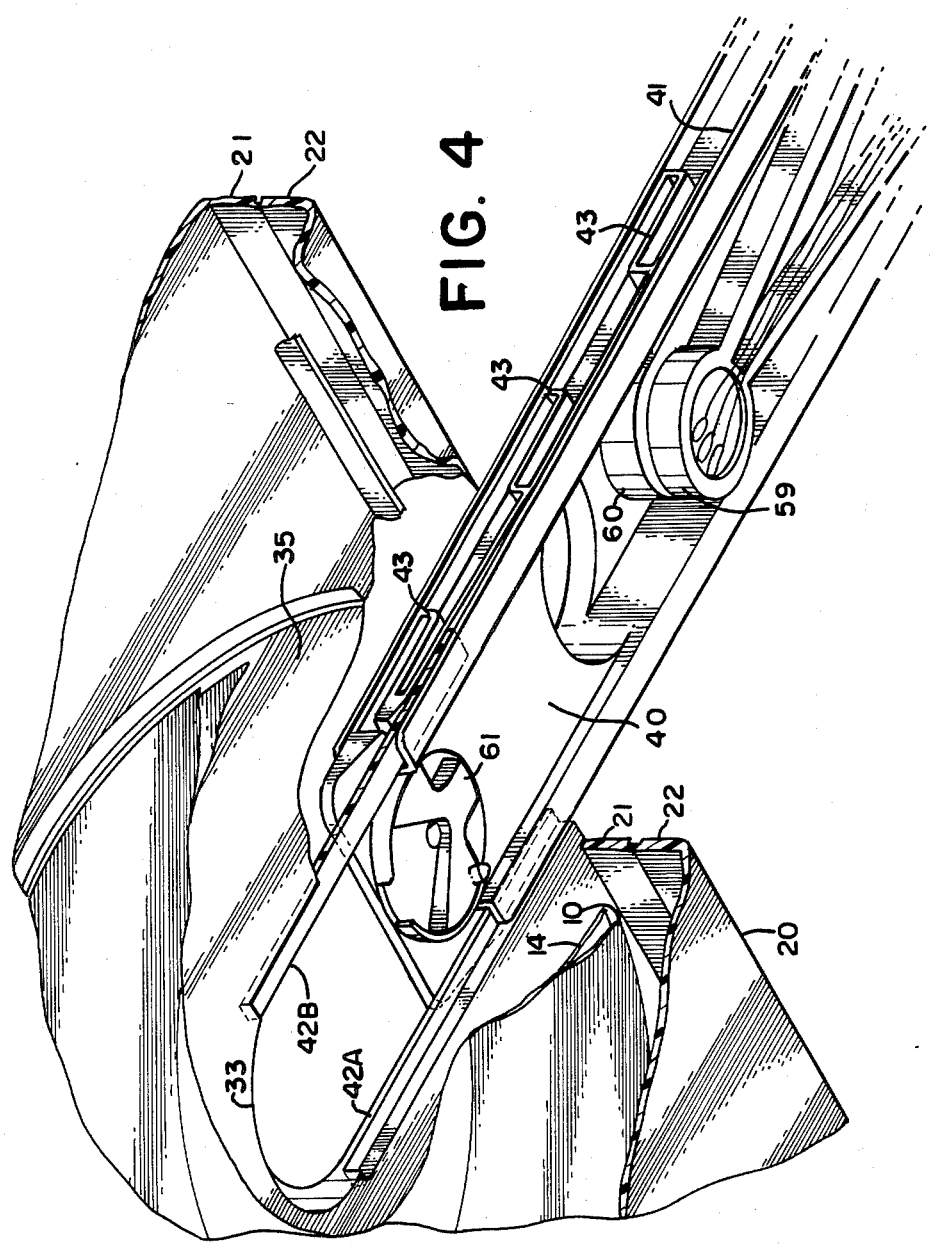

PLURAL MAGNETIC DISK ASSEMBLY

RELATED APPLICATIONS

This application is related by subject matter to the following commonly assigned co-pending applications, all of which are incorporated herein by reference: application Ser. No. 854,342, application Ser. No. 854,333, application Ser. No. 854,419, and application Ser. No. 854,130.

BACKGROUND OF THE INVENTION

The present invention relates to magnetic storage devices which use floppy record disks mounted in a cartridge. More particularly, this invention relates to the use of two or more magnetic floppy disks stabilized by a Bernoulli surface.

It is well known that a predictable and constant spacing between a record medium and a transducer is necessary in order to have successful non-contact magnetic retrieval and recording of data (i.e., read/write operation). One method of stabilizing the floppy disk is to rotate the disk at high speeds over a flat rigid plate, sometimes called a Bernoulli surface. In this way, an air bearing is created between the flexible magnetic disk and the rigid Bernoulli surface such that a constant and predictable spacing between the Bernoulli surface and the magnetic disk is established. Once the flexible magnetic disk is stabilized, the transducer can be brought into close proximity to the rotating disk at the proper distance from the disk surface. When a transducer "flies over" or is "coupled to" a magnetic disk, as those terms are used in the art, the transducer will penetrate or dimple the flexible medium without actually coming into physical contact with the medium. The distance between the record surface and the transducer surface can be precisely predicted when this dimpling phenomenon occurs. In this way, the floppy disk is stabilized by the Bernoulli surface and the spacing between the transducer and the disk surface can be precisely predicted and fixed.

It is desirable in the field of magnetic recording to achieve simultaneous access to two magnetic recording surfaces by two magnetic transducers. However, due to the dimpling of the magnetic medium as the transducer is flown in juxtaposition to the disk, it has not been possible to access both surfaces of the magnetic medium simultaneously when two transducers are substantially opposed to one another.

It has been shown in the prior art that two magnetic record surfaces can be accessed by two transducers by rotating each disk against a separate Bernoulli surface. See for example IBM Technical Disclosure Bulletin, Volume 19, No. 9 of February 1977. Another example of prior art shows two magnetic disks accessed by two separate transducers is Russian Pat. No. 594527. However, in this disclosure three stabilizing surfaces are used: one below the bottom disk, one above the top disk, and a single stabilizing surface which is held between the disks in the region of the transducer.

A disadvantage of prior art attempts at accessing two magnetic surfaces simultaneously is that prior art applications are not practical in today's small and portable magnetic disk drive devices. As can be seen from the above cited references, the prior art frequently utilized separate actuators and Bernoulli surfaces for each magnetic surface. In other cases, large and complex means were used to stabilize two or more magnetic surfaces.

SUMMARY OF THE INVENTION

In accordance with this invention, two or more flexible magnetic disks are coaxially joined and axially spaced such that a continuous air bearing exists between the functional portions of the disks. One of the disks contains means for allowing the evacuation of air from between the disks as the disks are rotated. One disk is juxtaposed to and stabilized by a Bernoulli plate. Stabilization of this disk against the Bernoulli plate serves in turn to stabilize the second disk as the disks are rotated. In this way, two substantially opposed transducers can simultaneously access the outer surfaces of two disks without causing substantial deformation of either disk by the transducer positioned adjacent to the opposite disk.

It is therefore an object of this invention to provide a compact and efficient device for recording and retrieving data to and from two flexible magnetic recording surfaces simultaneously.

It is a further object of this invention to provide a device for recording and retrieving data to and from two flexible magnetic disks contained in a rigid portable cartridge.

It is a still further object of this invention to provide a device which uses two substantially opposed transducers mounted on a common actuator for recording and retrieving data to and from two flexible magnetic disks simultaneously.

It is an additional object of this invention to provide a method for rotating two closely spaced flexible magnetic disks so as to create an outward flow of air from between the disks and stabilizing both magnetic disks by juxtaposing one of the disks to a Bernoulli surface.

The above and other features and objects of this invention will become more apparent upon consideration of the following preferred embodiment and appended claims.

BRIEF DESCRIPTION OF THE DRAWINGS

FIG. 4 is a cut away perspective view of a disk drive from below, which shows the assembled cartridge partially inserted into the disk drive.

DETAILED DESCRIPTION

Two preferred embodiments of the present invention will be described in detail below. Included with a description of the first embodiment is a description of the features common to both embodiments. Following thereafter is a description of the second embodiment of this invention insofar as it differs from the first embodiment.

Description of the First Embodiment

In the first embodiment of this invention two coaxially joined magnetic disks are spun against a Bernoulli surface contained within a rigid cartridge. An opening in this cartridge allows access by two substantially opposed transducers into the cartridge such that the outer surface of each magnetic disk can be simultaneously accessed by a separate transducer.

Figure 1A:
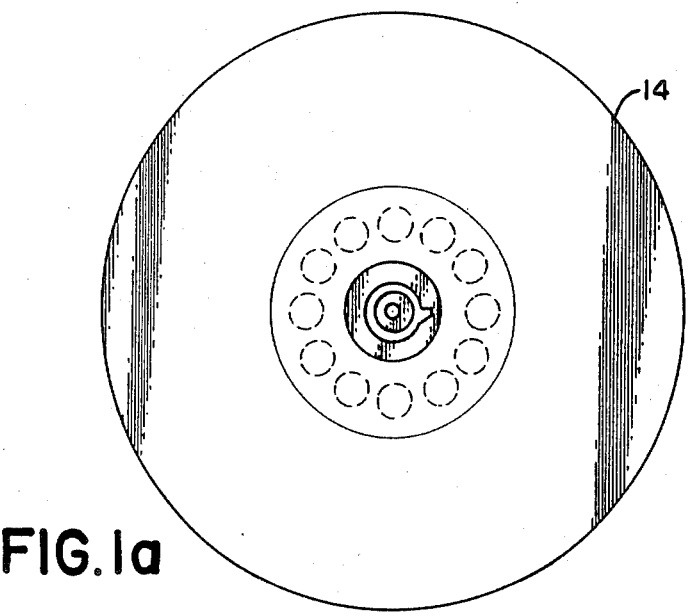
FIG. 1a is a top plan view of the upper disk made according to a first embodiment of this invention.
Figure 1B:
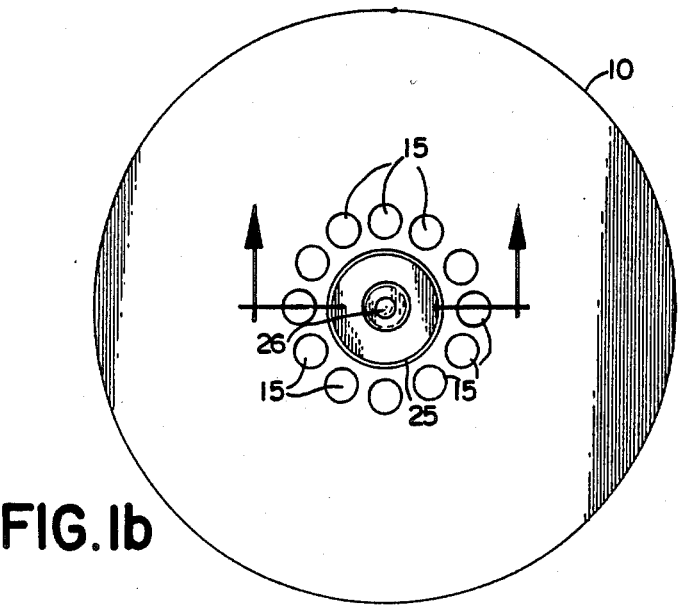
FIG. 1b is a bottom plan view of the lower disk made according to a first embodiment of this invention.
Figure 1C:
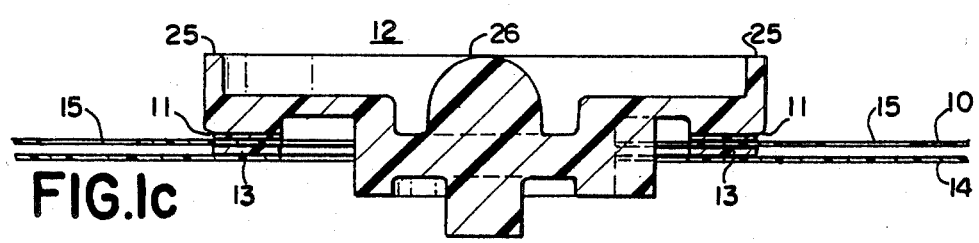
FIG. 1c is a cross sectional view of the disk pair made according to a first embodiment of this invention taken substantially along line 1c—1c of FIG. 1b, showing the upper disk and the lower disk attached to a centrally mounted disk hub.
Figure 5A:
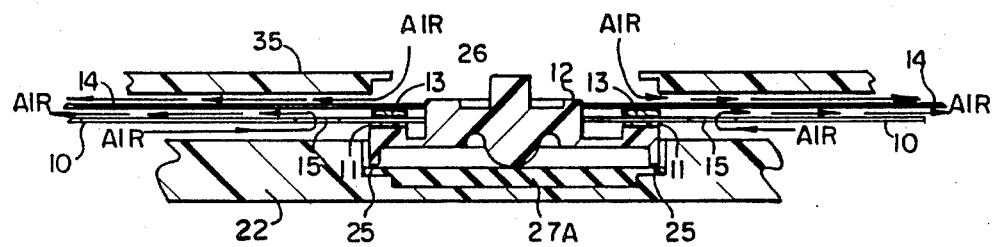
FIG. 5a is a cross sectional view of the central portion of the assembled cartridge according to a first embodiment of this invention as the disk pair is spinning at high speed.

Referring to FIGS. 1a-1c, the upper magnetic disk 14 of the first embodiment of this invention is joined to surface 11 of disk hub 12. Spacer 13 is coaxially joined (as described below) to disk 10 and disk 14. Disk 10 contains an array of twelve perforations 15 equally spaced from one another and equidistant from the center of disk 10. When disk 10 and disk 14 are rotated together on disk hub 12 at high speeds, apertures 15 allow air to move radially out from between disk 10 and disk 14. The flow of air is shown by the arrows marked AIR in FIG. 5a. In the preferred embodiment of this invention, disks 10 and 14 have nominal dimensions equivalent to the standard 5.25 inch "MYLAR" floppy disks widely used in the industry.

In order to achieve the proper flow of air from between disk 10 and disk 14, the thickness of disk spacer 13 is of critical importance. While the exact thickness will be a function of parameters such as the type of transducers used, the rate of rotation of the disks, the thickness of the disks, diameter of the disks, and others, the disk spacer should be approximately 0.25 mm thick for a standard disk thickness of approximately 0.1 mm. In addition, the disk spacer is not so large in diameter so as to impede the flow of air into apertures 15 or to engage the magnetically functional portion of either disk; for example, the outer diameter of disk spacer 13 is approximately the same as the outer diameter of disk hub 12. Disk spacer 13 is preferably integrally joined to disks 10 and 14 in order to achieve the most precise spacing between the disks as more fully disclosed in Ser. No. 854,130.

Figure 2:
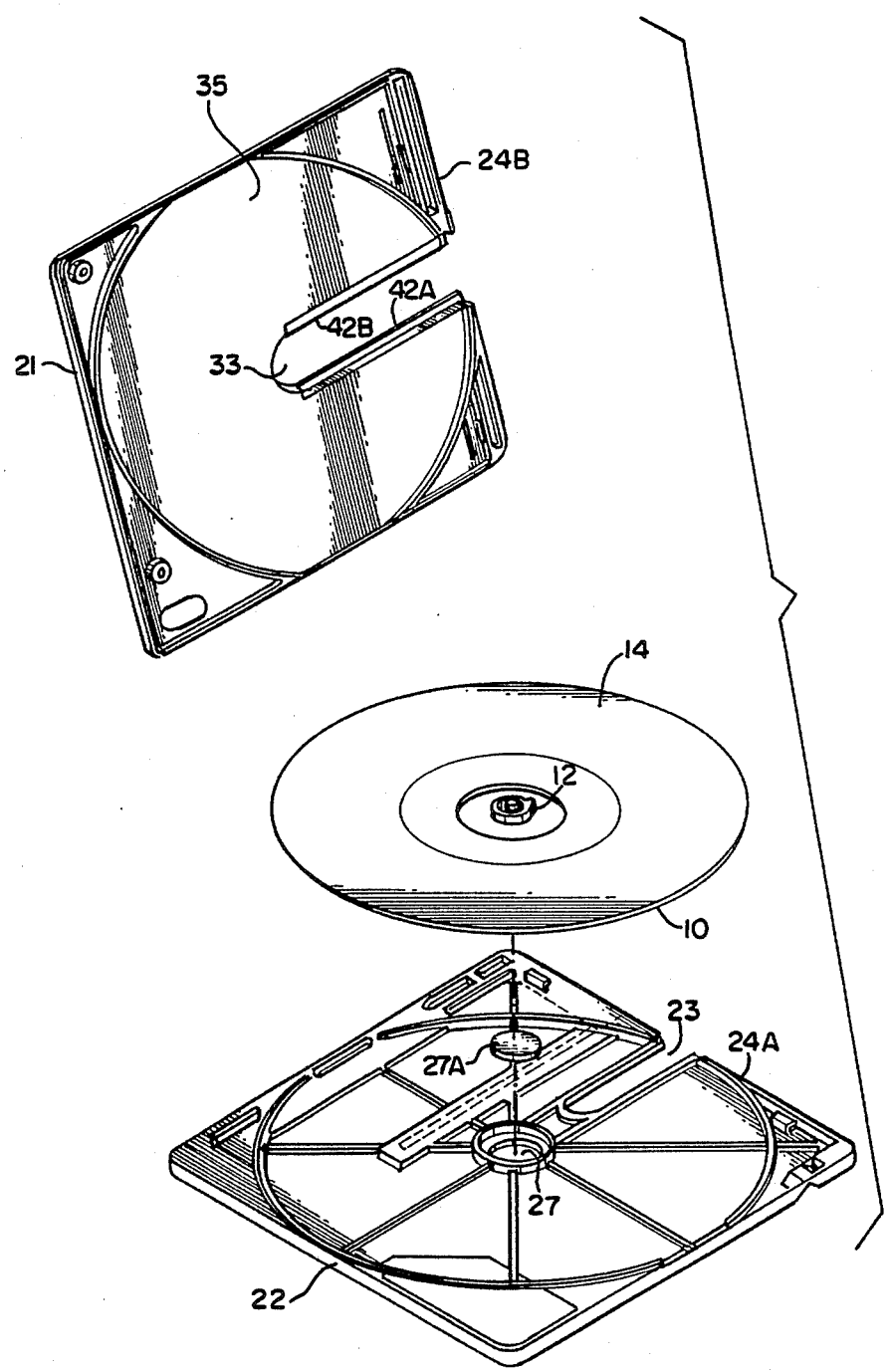
FIG. 2 is an exploded perspective view of the disk cartridge made according to the first embodiment of this invention which shows the interior surfaces of the cartridge and the disks contained within the cartridge.

According to the first embodiment of this invention, disks 10 and 14 are contained in a rigid cartridge 20. FIG. 2 is an exploded perspective view of cartridge 20 showing: the inside surface of cartridge top 21, the inside surface of cartridge bottom 22, and disk pair 10 and 14. In assembled form, disks 10 and 14 are contained within the chamber formed by joining cartridge bottom 22 and cartridge top 21. The cartridge bottom 22 has an opening 23 extending from its leading edge 24A to a point short of the center of the cartridge. The cartridge top 21 contains a Bernoulli surface 35 on its inside face which substantially inscribes a circular area therein. Cartridge top 21 has an opening 33 which, in assembled form, is coincidental with the opening 23 in the cartridge bottom 22 and extends from the leading edge 24B of cartridge top 21 to a point beyond the center of the cartridge.

Referring to FIGS. 1c and 2, the lower surface of disk hub 12 has a circumferential rim 25. A concentric knob 26 extends from the lower surface of disk hub 12 and to the plane formed by the circumferential rim 25. The lower surface of disk hub 12 sits in a dishlike opening 27 in cartridge bottom 22. The center of opening 27 is substantially in line with the center line of opening 33 in cartridge top 21 when the cartridge is assembled. Concentric knob 26 serves to provide a low friction surface on which the magnetic disks are rotated. Between the surface of dishlike opening 27 and concentric knob 26 is a resilient member 27A, as best revealed in FIG. 2. This member exerts a constant upward force on knob 26, thus assuring that the outer surface of disk 14 is urged towards Bernoulli surface 35. The resilient member can be an elastomeric disk as shown, a domed shape spring as disclosed in Ser. No. 854,333, or any other device which serves this purpose. When motor spindle 61 (FIG. 4) enters cartridge 20 through aperture 33 in cartridge top 21 and rotates disk hub 12 at speeds known to those skilled in the art, an air bearing is formed between the surface of disk 14 and Bernoulli surface 35 as shown by the arrows marked AIR in FIG. 5a. This air bearing serves to stabilize disk 14 as it rotates in juxtaposition to the Bernoulli surface 35. During high speed rotation of the disk pair, centrifugal force causes air to be ejected from between the disks. Evacuation of air from between disk 10 and 14 results in a partial vacuum between the disks wherein the atmosphere surrounding the disks is at a higher pressure than the pressure between the disks. This pressure differential causes flow of air into openings 15 and then radially out from between the disks which in turn sets up a stabilizing air bearing or cushion of air between disks 10 and 14. In this way, disk 14 is stabilized by the rigid Bernoulli surface 35 in cartridge top 21, and disk 10 is in turn stabilized by rotation in juxtaposition to the stabilized surface of disk 14. In this manner both disks are stabilized by the single Bernoulli surface. While this invention is described with respect to an embodiment providing a disk pair, it will be appreciated by those skilled in the art that this invention is not so limited. That is, it may be possible according to this invention to stabilize three or four rotating floppy disks with a single Bernoulli surface.

The air ejected radially from between disk 10 and 14 when the disk pair is rotated at sufficient speed sets up an air bearing between the two disks as disclosed. The rate of rotation necessary to effect this air bearing is a function of several parameters, such as: disk size, aperture configuration, disk thickness, disk diameter, disk spacing, and others. It has been found that speeds as low as 1500 rpm are adequate to produce an effective air bearing between the disks. However, a higher degree of stabilization can be achieved when the disks are rotated at higher speeds; for example, at 3000 rpm. Variation of the pertinent parameters to achieve a balance between rotation speed and disk wear is within the scope of this invention. In addition, variation of the shape, size, and number of apertures 15 is also within the scope of this invention, although it has been found that simple round holes as shown are preferred.

Figure 3:
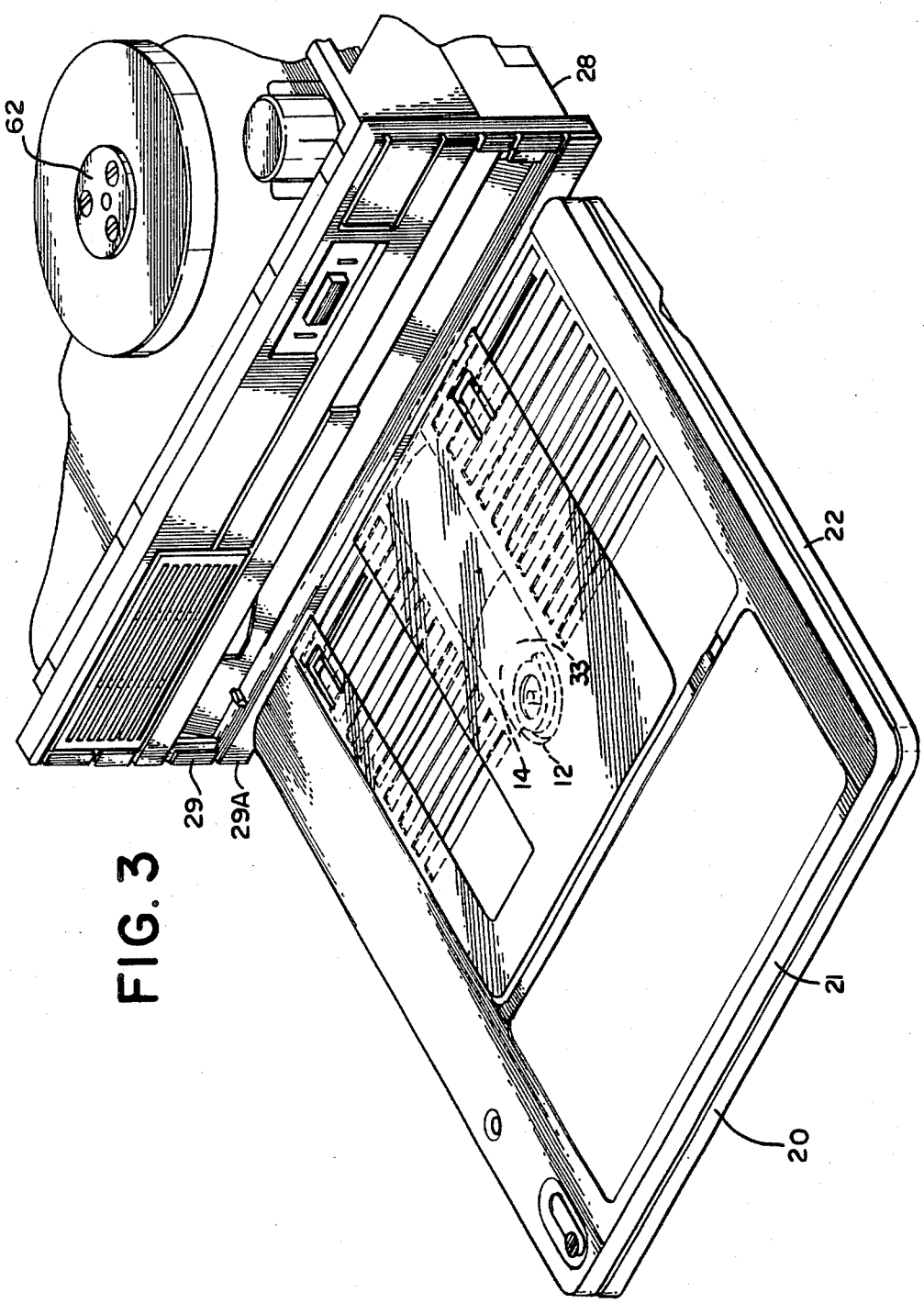
FIG. 3 is a perspective view from above of the assembled cartridge and a fragmentary perspective view of a disk drive in which it is used, where the relative positions of each is shown just prior to insertion of the cartridge into the drive.

Two disks stabilized according to this invention can be accessed for read/write operation by two substantially opposed magnetic transducers simultaneously. Referring to FIGS. 3 and 4, a drive spindle 61 (FIG. 4) has access to the interior of the cartridge 20 through opening 33 in the cartridge top 21 and transducers 59 and 60 have access to the interior of the cartridge through openings 23 and 33. Drive spindle 61 and transducers 59 and 60 are mounted within disk drive 28. Drive spindle 61 is coaxially mounted to drive motor 62 for rotation thereby as disclosed in Ser. Nos. 854,342 and 854,333. In the preferred embodiment, disk hub 12 is coupled to drive spindle 61 as disclosed in Ser. No. 854,333.

Figure 5B:
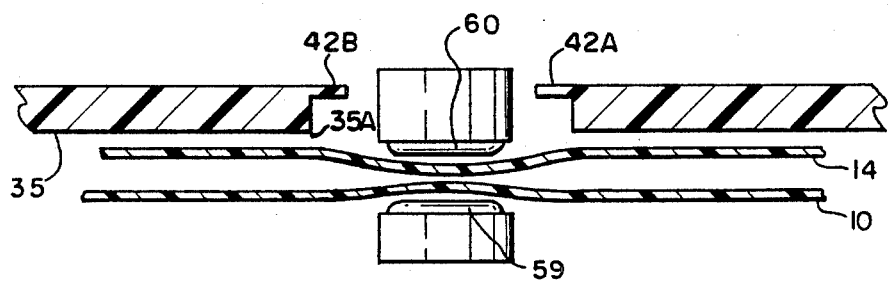
FIG. 5b is a diagrammatic view of the disk pair according to a first embodiment of this invention in read/write relationship to a pair of opposed transducers as the disk pair is spinning at high speed.

FIG. 3 shows cartridge 20 assembled and about to enter disk drive 28 through opening 29. Opening 29 is normally closed by hinged cover 29A which is moved to an open position as cartridge 20 is inserted into drive 28. Once cartridge 20 is fully inserted into drive 28, transducers 59 and 60 are actuated towards disks 10 and 14 and sandwich the disks between their surfaces during the read/write function. Although neither transducer surface physically contacts the disk surface, a proper transducer surface—a feature well known in the art—in close proximity to the disk surface causes each disk surface to "dimple". This phenomenon, shown in FIG. 5b, is known as "coupling" the disk to the transducer and is an essential feature of high performance non-contact magnetic recording and retrieval. It is therefore apparent that two sides of a single flexible magnetic disk could not be simultaneously accessed by two substantially opposed heads; for example, if a single disk were used, head 59 would interfere with the coupling of head 60, and head 60 would likewise interfere with the coupling of head 59. When two magnetic disks are used according to this invention, however, the air bearing created between the disks as they are rotated serves to stabilize the disks as well as to cushion each disk with respect to the other so that coupling can take place. In this way, two magnetic surfaces can be simultaneously coupled to two transducers in practically the same space required for a single disk. Both embodiments of this invention therefore advantageously utilize a small portable cartridge to house the invention.

Referring once again to FIG. 4, cartridge 20 is seen in a cut away perspective view from below as it engages spicule member 40 within disk drive 28. Disk hub 12 has been cut away from this view in order to more clearly show how the disks are aligned and rotated. Drive spindle 61 is rotatably mounted to spicule member 40. Spicule member 40 contains reference surfaces 41 which are a precise predetermined distance from the surface of drive spindle 61. When cartridge 20 is inserted into disk drive 28, rails 42A and 42B in cartridge 20 engage reference surface 41. "S" shaped resilient members 43 insure continued and firm contact between reference rails 42A and 42B and reference surface 41 while the cartridge is within disk drive 28 as disclosed in Ser. Nos. 854,333 and 854,130. This interaction between reference rails 42A/42B and reference surface 41 assures proper planar alignment between the disk pair, the transducers, and the Bernoulli surface.

Description of the Second Embodiment

In the description of the second and more preferred embodiment that follows, features which are generally common to both the first and second embodiments of this invention have been designated by the same symbol used to describe the first embodiment. In addition, the second embodiment will be described in detail only so far as it differs from the first embodiment described earlier.

Figure 6:
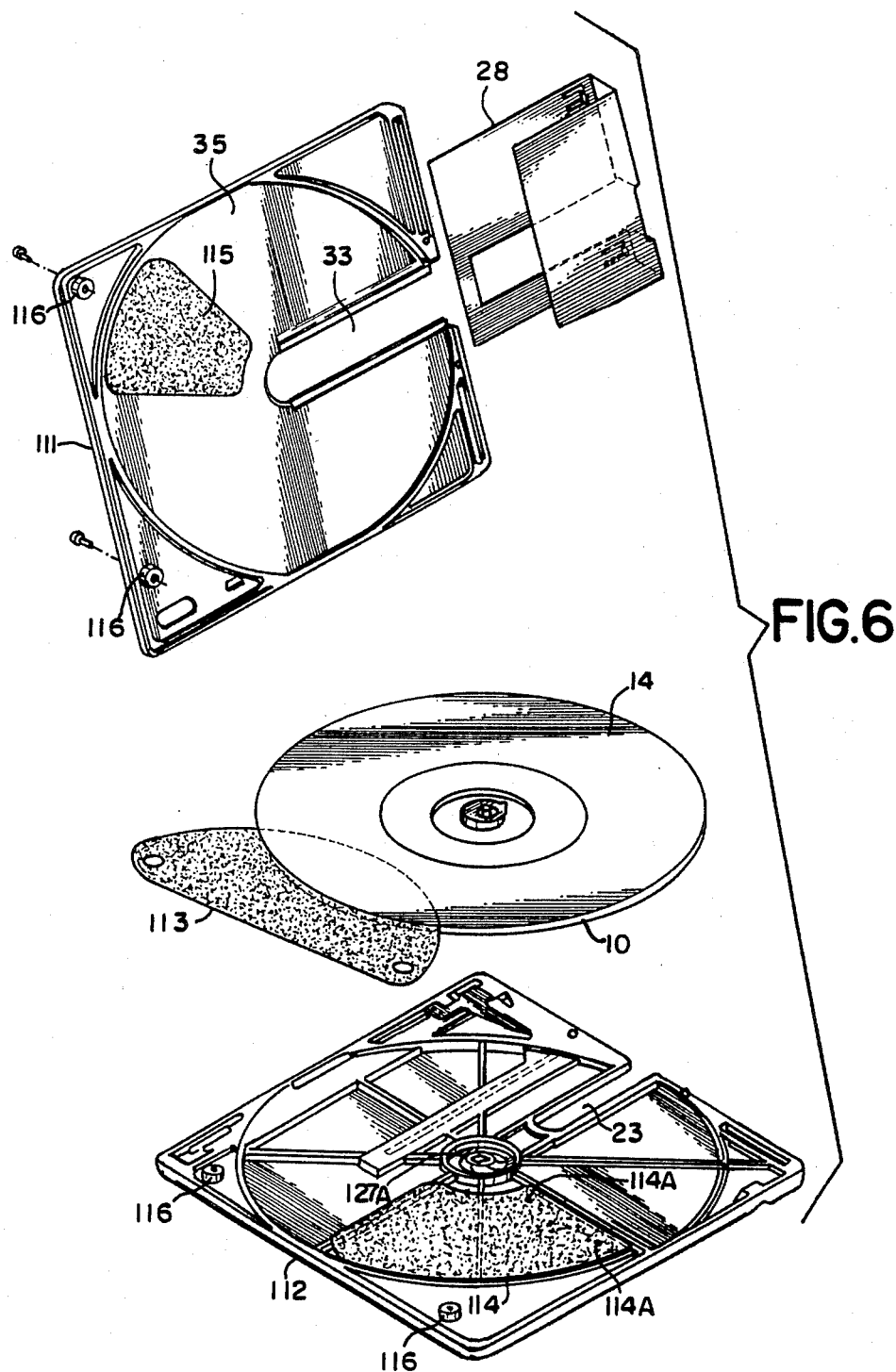
FIG. 6 is an exploded perspective view of the disk cartridge made according to the second embodiment of this invention which shows the interior surfaces of the cartridge and the disks contained within the cartridge.

Referring now to FIG. 6, an exploded perspective view of cartridge 101 shows the inside surface of cartridge top 111; the inside surface of cartridge bottom 112; inter disk wiper 113 sandwiched by disk pair 10 and 14; and shutter 28. In assembled form, disks 10 and 14 are contained within the chamber formed by the joining of cartridge bottom 112 and cartridge top 111, and shutter 28 is slideably mounted on the cartridge. Bottom disk wiper 114 is heat staked to the cartridge bottom 112 at heat stake points 114A. When in assembled form, the lower surface of disk 10 contacts bottom disk wiper 114. When the cartridge is inserted into the disk drive 28 and rotated thereby, any foreign materials on the underside of disk 10 are wiped away as the disk contacts bottom disk wiper 114. Inter-disk wiper 113 is sandwiched between disk 14 and disk 10 and serves to remove contaminates from between the disk pair as the disk rotates. Hold down nodes 116 in cartridge top 111 engage hold down nodes 117 in cartridge bottom 112 and hold inter-disk wiper 113 within the cartridge and between the disks. Top wiper 115 is adhesively joined to Bernoulli surface 35 and wipes the upper surface of disk 14 as it rotates.

Since each of the wipers described above is in contact with a portion of the disk pair as it rotates, the placement and characteristics of the wiper relative to disk pair 10/14 are important features of this invention. In the view shown in FIG. 6, disk pair 10/14 is rotated in the clockwise direction when used in disk drive 28. As mentioned earlier, rotation of the disk pair at proper speeds causes an air bearing to be formed between Bernoulli surface 35 and upper disk 14 as well as between disk 14 and 10. These air bearings serve to stabilize the floppy disks as they rotate and thus allow precise and accurate magnetic transduction of the data contained thereon. Since transduction of the data in both the first and second embodiments of this invention takes place in the region of apertures 23 and 33 in the disk cartridge, it is important that the wipers included in the cartridge according to this second embodiment produce minimum interference with the stability of the rotating disks in the region of apertures 23 and 33. Applicant has found that placement of the wipers 113, 114, and 115 in the rear of the cartridge produces minimum interference with the stability of the rotating disks in the area where transduction occurs. As the term is used herein, the rear of the cartridge comprises that region of the cartridge which is angularly displaced from the center line of the apertures 23 and 33 by greater than about 90° and less than about 270° from the point of view of the rotating disks. It is also preferred that the top and bottom wipers are made from a suitable wiper laminant and that all three wipers are constructed so as be substantially burr and tear free. In addition, the wipers are substantially flat and wrinkle free. Although the exact shape and thickness of each wiper will depend upon the specific other dimensions of the cartridge, the wipers in no event are of a shape or thickness which interferes with the stability of the rotating disks. Applicant has found that use of inter-disk wiper 113 according to the most preferred embodiment of this invention has a tendency to augment the stabilization of the disk pair during high speed rotation. While the exact principle behind this surprising phenomenon is not understood, the result is clearly desirous.

The shape, location, and materials for the wipers in the most preferred embodiment of this invention will now be described. Bottom disk wiper 114 is a quarter moon shaped wiper located in the second quadrant of the cartridge, as measured relative to the disk pair as it rotates past opening 23. Wiper 114 is comprised of a nylon/rayon laminant wherein the nylon acts as a backing material to provide rigidity to the wiper and the rayon provides a textured wiping surface in contact with the disk. In the preferred embodiment, the bottom wiper 114 is approximately 0.015 mm thick and positioned so as to just contact the lower surface of disk 10 when the disk pair rotates. Inter-disk wiper 113 is half moon shaped and is contained in the rear half of the cartridge. The inter-disk wiper is a non woven rayon/polypropylene blend. In the preferred embodiment of this invention, the inter-disk wiper is of a thickness approximately equal to the spacing between the disks. In the most preferred embodiment, inter-disk wiper 114 is approximately 0.008 mm thick. Top wiper 115 is wedge shaped and contained in the second quadrant of the cartridge. This disk wiper is made of the same rayon/nylon laminant used for the bottom wiper 114. In the preferred embodiment, top wiper 115 is of a thickness approximately equal to the spacing between the upper surface of disk 114 and Bernoulli surface 35 during high speed rotation of the disks. In the most preferred embodiment, wiper 115 is also approximately 0.015 mm thick.

Figure 7A:
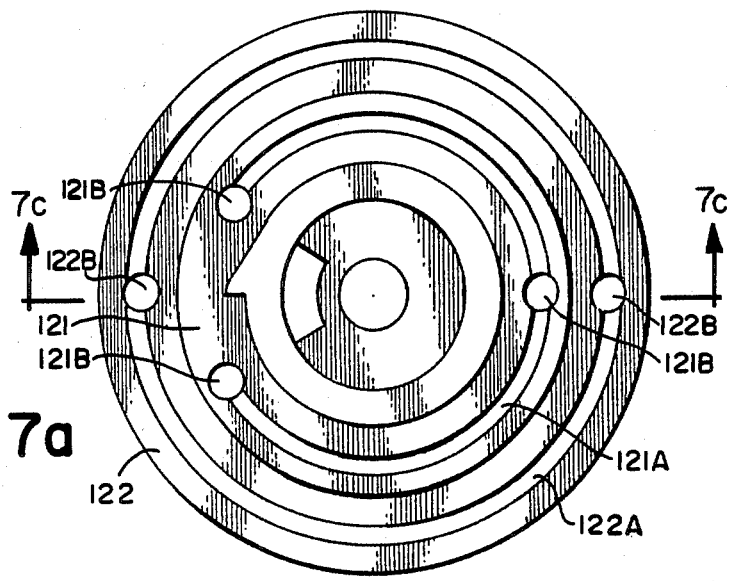
FIG. 7a is a top plan view of the disk hub made according to the second embodiment of this invention.
Figure 7B:
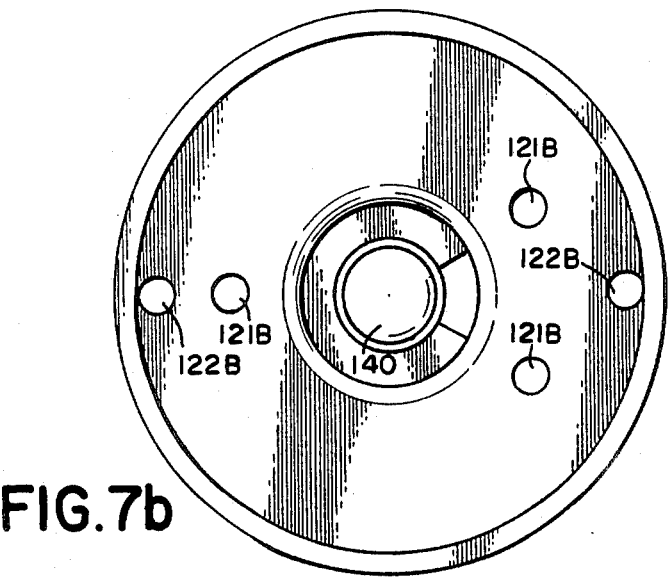
FIG. 7b is a bottom plan view of the disk hub made according to the second embodiment of this invention.
Figure 7C:
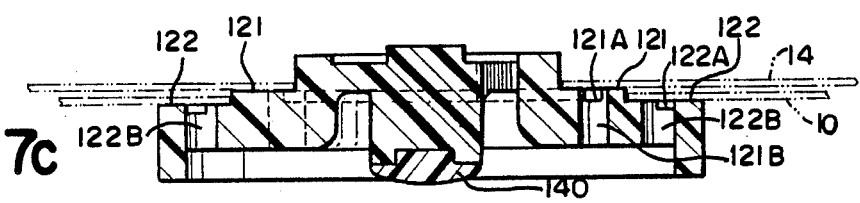
FIG. 7c is a cross sectional view through the center of the disk hub taken substantially along the lines 7c—7c of FIG. 7b.
Figure 8A:
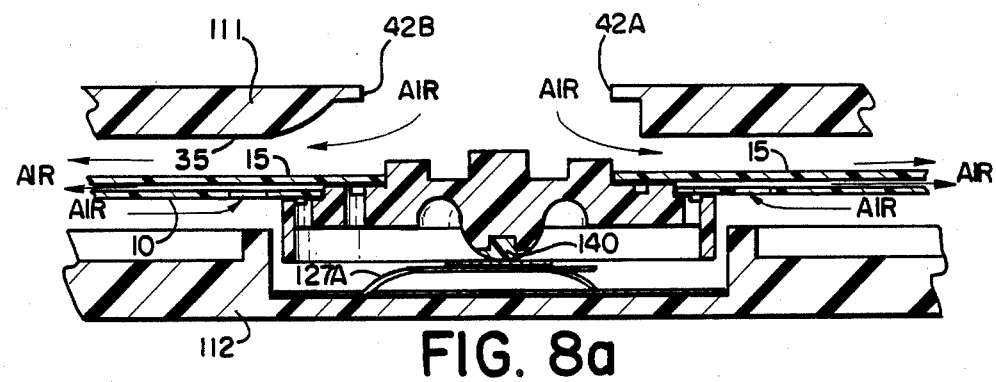
FIG. 8a is a cross sectional view of the central portion of the assembled cartridge made according to a second embodiment of this invention as the disk pair is spinning at high speed.
Figure 8B:
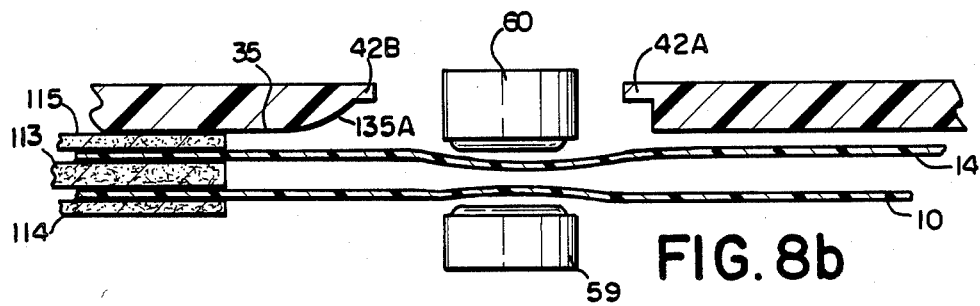
FIG. 8b is a diagrammatic view of the disk pair according to a second embodiment of this invention in read/write relationship to a pair of opposed transducers as the disk pair is spinning at high speed.
Figure 8C:
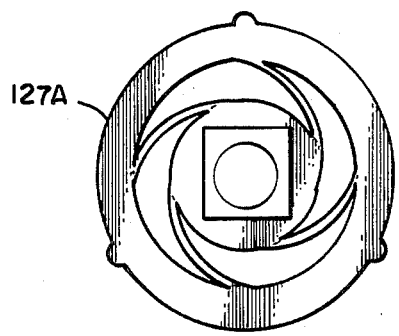

Referring now to FIGS. 7a through 7c, the relationship between disk pair 10/14 and disk hub 120 is revealed. Disk hub 120 contains two coaxial, axially spaced plateau surfaces: upper plateau 121 and lower plateau 122. Annular grooves 121A and 122B are contained within upper plateau 121 and lower plateau 122 respectively. Disk hub 120 may also contain apertures 121B and 122B which allow communication between the underside of the disk hub and annular slots 121A and 122A respectively. Upper disk 14 is mounted to upper plateau surface 121 and lower disk hub 10 is mounted to lower plateau surface 122. The spacing between the disks is determined by the spacing between the respective plateau surfaces. In this second embodiment, each disk is mounted directly to disk hub 122, thereby eliminating the need for a disk spacer between the disks while maintaining precise spacing between the disks.

One procedure which may be used for mounting each disk to its respective plateau surface is as follows: the disk is first held firmly against the plateau surface to which it is to be mounted; a fluid adhesive material is injected into the appropriate plateau aperture to fill the appropriate plateau annular slot; and the disk is held in this position until the adhesive dries within the annular slot. In this way, each disk is mounted to its respective plateau surface without an adhesive gap therebetween. As a result, the distance between the inside surfaces of disk 10 and 14 will be precisely that distance between each plateau surface. In order to achieve this precise spacing, however, it is important that the disk surface be held in contact with the plateau surface with sufficient force to maintain the adhesive totally within the annular slot and to prevent extrusion of the adhesive between the disk and the plateau surface. However, it has been found that the fluid adhesive material used according to this method has a tendency to shrink upon drying. This shrinkage will, in turn, cause a disadvantageous crimping or wrinkling of the magnetic media. Accordingly, a more preferred method for mounting each disk to its respective plateau surface has been discovered. In this preferred method, a sheet of aluminum or steel having an annular groove of a precisely defined depth is provided. In the preferred embodiment of this invention, the groove is 0.076 mm deep. An adhesive material is spread upon the aluminum sheet so as to ensure that the annular groove is filled with the adhesive material. An adhesive material is spread upon the aluminum sheet so as to ensure that the annular groove is filled with the adhesive material. In a preferred embodiment of this invention, the adhesive material is a methylmethacrylate resin; and in a more preferred embodiment of this invention, the adhesive is a material marketed under the trademark "DEPEND" by the Locktight Corporation. Glue is then screened from the aluminum sheet so as to leave a uniform layer of glue 0.076 mm thick within the groove. A "TEFLON" transfer ring having a surface configuration corresponding approximately to plateau surface 122 is then moved into engagement with the glue contained within the groove, whereupon a thin layer of glue is transferred to the transfer ring. A thin film of initiator or activator is then applied to the plateau surface 122, and the transfer ring is then pressed into engagement with that surface so as to leave a thin layer of glue no greater than 0.076 mm thick thereupon. Disk 22B is then pressed into engagement with plateau surface 122. Annular slot 122A provides a reservoir into which any extraneous glue may flow as the glue is compressed between the two surfaces. The same procedure is then used to apply disk 22A to plateau surface 121. It should be noted that in this procedure, it is neither desirable nor necessary to include apertures 121B and 122B in disk hub 120.

In the most preferred embodiment of this invention, it is desirable that disk hub 120 and disk pair 10/14 have substantially the same coefficients of expansion. This is an important feature of this invention since different coefficients of thermal expansion may cause a buckling or warping of one disk with respect to the other. It will be appreciated by those skilled in the art, however, that achieving this objective is a relatively difficult task since the polyester film used for the floppy disk is inherently flexible; on the other hand it is necessary that the disk hub of this invention be relatively rigid and hard. Accordingly, it has been discovered that a disk hub comprised of 20 to 30% glass filled polycarbonate has substantially the same coefficient of thermal expansion as the polyester film used for the floppy disk pair.

Referring now to FIG. 9A, a cross sectional view of the central portion of the assembled cartridge during high speed rotation made according to the second embodiment of this invention is revealed. This view reveals the following distinctions between the first embodiment and the second embodiment: domed shaped spring member 127A is used in place of elastomeric disk 27A of the first embodiment; disk hub 120 described earlier is used in place of disk hub 12 of the first embodiment; the transition from cartridge rail 42B to Bernoulli surface 35 has been rounded from the sharp angled portion 35a shown in FIG. 5b to a more aerodynamic shape as indicated at 135A in FIG. 9b. Referring now to FIG. 9b, which is a diagrammatic view of the disk pair in read/write relationship to transducers 59 and 60, disk pair 10/14 is rotated generally from right to left. During the read/write operation, disk 10 and disk 14 each dimple as they move past transducers 59 and 60. This dimpling effect causes a deflection or curvature of the disk in the area of the transducer. This deflection or non linear movement of disk 14 tends to accelerate the disk towards Bernoulli surface 35 as the disk comes off transducer 60. In order to protect the disk from "kicking" or "banging" into the Bernoulli surface or into the transition between the Bernoulli surface and rail 42A, applicant has found that forming transition 135A in an aerodynamic shape allows stable movement of disk 14 from the coupled to the uncoupled position. This feature not only achieves a more stable coupling between the transducer and the disk, but also avoids damage to the disk which may be caused by a violent crashing of the disk into the sharp angle transition of the first embodiment.

While particular embodiments of this invention have been shown and described, modifications are within the true spirit and scope of this invention. The appended claims are, therefore, intended to cover all such modifications.

What is claimed is:

1. A magnetic storage device of the type which is rotated by a drive spindle during the read/write operation, said device comprising:
   (a) a spacing element;
   (b) two flexible disks rotatable by the drive spindle, said disks being larger than said spacing element and coaxially joined to said spacing element such that said disks are spaced at the center;
   (c) a single Bernoulli surface for said two disks, said single Bernoulli surface juxtaposed to a first of said disks such that said first disk is stabilized by said Bernoulli surface when said disks are rotated by the drive spindle; and
   (d) evacuating means for allowing passage of air radially outward from between said first disk and the second of said disks such that said second disk is stabilized by said first disk when said disks are rotated by said drive spindle.

2. A magnetic storage device as recited in claim 1 wherein said evacuating means comprises an aperture in said second disk.

3. A magnetic storage device as recited in claim 1 wherein said evacuating means comprises an aperture in said first disk.

4. A magnetic storage device as recited in claim 1 further comprising means for urging said first disk towards said Bernoulli surface during rotation of said disks by the drive spindle.

5. A magnetic storage device as recited in claim 1 further comprising two substantially opposed transducers wherein each transducer is in read/write relationship with the outer surface of a separate one of said disks.

6. A magnetic storage device as recited in claim 5 wherein said Bernoulli surface has an aperture therein through which at least one of said transducers passes during the read/write operation.

7. A magnetic storage device as recited in claim 5 wherein said Bernoulli surface has an aperture therein, at least a portion of an edge of said aperture adjacent to said Bernoulli surface having a smooth continuous shape.

8. The magnetic storage device of claim 7 wherein said smooth continuous shape is an aerodynamic shape.

9. The magnetic storage device of claim 7 wherein said disks are rotated towards said edge of said aperture.

10. The magnetic storage device of claim 9 wherein said portion of said edge runs substantially the entire length of said edge.

11. The magnetic storage device of claim 1 wherein said magnetic storage device is a portable magnetic storage device.

12. The magnetic storage device of claim 11 wherein said portable magnetic storage device comprises a rigid apertured cartridge containing said spacing element, said two flexible disks, said Bernoulli surface, and said evacuating means.

13. The magnetic storage device of claim 1 wherein said spacing element comprises a disk hub.

14. The magnetic storage device of claim 13 wherein said disk hub has two spaced and parallel plateau surfaces integral therewith, each of said plateau surfaces comprising a surface upon which one of said two flexible disks is mounted.

15. A magnetic storage device of a type which can be operated in a read or write mode when being rotated about a predetermined axis of rotation, comprising:
   at least two flexible magnetic disks positioned coaxially about said axis of rotation and having about the same disk radius,
   spacer means for holding said disks spaced from each other by a predetermined axial distance and for providing an air space between said disks, said space having a peripheral opening at the peripheries of said disks,
   a single Bernoulli surface for said two disks, said single Bernoulli surface in operative association with one of said disks, and
   entry means in the other of said disks for admitting air through said other disk and into said air space, whereby when said device is rotated air is drawn through said entry means and thrown out of said peripheral opening to produce an air bearing between said disks.

16. The device as described in claim 15, wherein said spacer means comprises an annular spacer having an outer radius smaller than that of either disk, the outside of said spacer defining the radially inner boundary of said air space.

17. The device as described in claim 16, wherein said entry means comprises at least one aperture in said other disk positioned at a radius greater than said spacer outer radius.

18. The device as described in claim 15, wherein said entry means comprises a plurality of openings at about a disk radius which is between said spacer outer radius and about one-forth said disk radius.

19. The device as described in claim 15, wherein said entry means comprises a plurality of openings at about a disk radius which is between said spacer outer radius and about one-half said disk radius.

20. A method for stabilizing at least two coaxially spaced and joined magnetic disks wherein the central space between said disks is in fluid communication with the atmosphere surrounding said disks, said method comprising:
- (a) juxtaposing one of said disks and a single Bernoulli surface whereby said single Bernoulli surface is used for said two disks;
- (b) rotating said disks at a speed sufficient to induce movement of air surrounding said disks into the central space between said disks and then radially outward to the atmosphere surrounding said disks; and
- (c) coupling each of said disks with substantially opposed tranducer.

21. The method of claim 20 further comprising the step of coupling each of said disks with substantially opposed transducers.

22. The method of claim 21 wherein said coupling step comprises the step of actuating said transducer radially with respect to said disks.

23. The method of claim 22 wherein said actuating step comprises simultaneously actuating said transducers.

24. A magnetic storage device of the type which is rotated by a drive spindle during the read/write operation, said device comprising:
- (a) at least two flexible disks of a first diameter;
- (b) means for coaxially joining said disks in precise spaced relation, said means located substantially coaxially of said disks and being of a second diameter less than said first diameter;
- (c) a single Bernoulli surface for said two disks, said single Bernoulli surface juxaposed to a first of said disks such that said first disk is stabilized by said single Bernoulli surface when said disks are rotated by the drive spindle; and
- (d) evacuating means for allowing passage of air radially outward from between said first disk and the second disk such that said second disk is stabilized by said first disk when said disks are rotated by said drive spindle.

25. A magnetic storage device as recited in claim 24 wherein said evacuating means comprises an aperture in said second disk.

26. A magnetic storage device as recited in claim 24 wherein said evacuating means comprises an aperture in said first disk.

27. A magnetic storage device as recited in claim 24 further comprising means for holding said first disk a predetermined distance from said Bernoulli surface during rotation of said disks by the drive spindle.

28. A magnetic storage device as recited in claim 24 further comprising two substantially opposed transducers wherein each transducer is in read/write relationship with the outer surface of a separate one of said disks.

29. A magnetic storage device as recited in claim 24 wherein said Bernoulli surface has an aperture therein through which at least one one of said transducers passes during the read/write operation.

30. A magnetic storage device as recited in claim 24 wherein said Bernoulli surface has an aperture therein, at least a portion of an edge of said aperture adjacent to said Bernoulli surface having a smooth continuous shape.

31. The magnetic storage device of claim 30 wherein said smooth continuous shape is an aerodynamic shape.

32. The magnetic storage device of claim 30 wherein in operation said disks are rotated towards said edge of said aperture.

33. The magnetic storage device of claim 32 wherein said portion of said edge runs substantially the entire length of said edge.

* * * * *